US008161297B2

(12) United States Patent
Dohi

(10) Patent No.: US 8,161,297 B2
(45) Date of Patent: Apr. 17, 2012

(54) PRINTING SYSTEM, INFORMATION PROCESSING APPARATUS, PRINTING APPARATUS, PRINT MANAGEMENT METHOD, AND STORAGE MEDIUM

(75) Inventor: Makoto Dohi, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 11/620,953

(22) Filed: Jan. 8, 2007

(65) Prior Publication Data

US 2007/0180273 A1    Aug. 2, 2007

(30) Foreign Application Priority Data

Jan. 23, 2006  (JP) ................................. 2006-014195

(51) Int. Cl.
*G06F 21/00* (2006.01)
(52) U.S. Cl. ........ 713/193; 358/1.9; 358/1.14; 713/150; 713/189
(58) Field of Classification Search .................... None
See application file for complete search history.

(56) References Cited

U.S. PATENT DOCUMENTS

| 6,745,166 | B1 * | 6/2004 | Sugahara et al. ............... 705/57 |
| 6,889,252 | B2 * | 5/2005 | Lacome D'Estalenx ..... 709/220 |
| 7,003,667 | B1 * | 2/2006 | Slick et al. ..................... 713/182 |
| 7,136,486 | B2 * | 11/2006 | Gassho ............................ 380/51 |
| 7,222,368 | B2 * | 5/2007 | Wiley et al. ...................... 726/27 |
| 7,275,159 | B2 * | 9/2007 | Hull et al. ...................... 713/171 |
| 7,305,556 | B2 | 12/2007 | Slick |
| 7,327,478 | B2 * | 2/2008 | Matsuda ....................... 358/1.14 |
| 7,349,543 | B2 * | 3/2008 | Simpson et al. ............... 380/270 |
| 7,506,159 | B2 | 3/2009 | Shima |
| 7,562,223 | B2 * | 7/2009 | Ragnet et al. ................. 713/171 |
| 2002/0042884 | A1 * | 4/2002 | Wu et al. ........................ 713/201 |
| 2003/0090695 | A1 * | 5/2003 | Murata ......................... 358/1.13 |
| 2003/0105963 | A1 | 6/2003 | Slick |
| 2003/0182587 | A1 * | 9/2003 | Morrison et al. ............. 713/202 |
| 2004/0165211 | A1 * | 8/2004 | Herrmann et al. ............ 358/1.15 |
| 2004/0172586 | A1 * | 9/2004 | Ragnet et al. ................. 715/500 |
| 2005/0094182 | A1 * | 5/2005 | Reese et al. ................... 358/1.14 |
| 2005/0149755 | A1 | 7/2005 | Shima |
| 2005/0204071 | A1 * | 9/2005 | Vance ............................... 710/8 |
| 2005/0228986 | A1 | 10/2005 | Fukasawa |
| 2005/0273852 | A1 * | 12/2005 | Ferlitsch .......................... 726/17 |
| 2006/0238789 | A1 * | 10/2006 | Pesar ........................... 358/1.13 |
| 2006/0279761 | A1 * | 12/2006 | Wang et al. ................... 358/1.14 |

FOREIGN PATENT DOCUMENTS

| EP | 1320009 A2 | 6/2003 |
| EP | 1320009 A3 | 11/2005 |
| JP | 08-244314 A | 9/1996 |
| JP | 2001-027968 A | 1/2001 |

(Continued)

*Primary Examiner* — Vivek Srivastava
*Assistant Examiner* — Thomas Lauzon
(74) *Attorney, Agent, or Firm* — Canon USA Inc. IP Division

(57) ABSTRACT

An information processing apparatus encrypts data that is to be printed by a printing apparatus and stored in a storage device detachably connected to the information processing apparatus so that the encrypted data can be decrypted by the printing apparatus. Once the data has been encrypted, the information processing apparatus stores the encrypted data in the storage device. After the storage device including the encrypted data has been detached from the information processing apparatus and connected to the printing apparatus, the printing apparatus decrypts the encrypted data stored in the storage device and executes a printing process according to the decrypted data.

16 Claims, 12 Drawing Sheets

FOREIGN PATENT DOCUMENTS

| | | |
|---|---|---|
| JP | 2003-224561 A | 8/2003 |
| JP | 2004-038875 A | 2/2004 |
| JP | 2005-125607 A | 5/2005 |
| JP | 2005-303676 A | 10/2005 |

* cited by examiner

PREPARATION BEFORE LEAVING OFFICE

PROCESSING AT OUTSIDE LOCATION

COPY OR MOVE PRINT DATA TO ADMINISTRATOR'S PC

ENCRYPT DATA USING SECRET KEY OF ADMINISTRATOR

REWRITE ENCRYPTED DATA ONTO VISITOR'S STORAGE DEVICE

CONNECT STORAGE DEVICE TO
PREDETERMINED PRINTING APPARATUS

READ ENCRYPTED DATA

DECRYPT DATA USING SECRET KEY
STORED IN PRINTING APPARATUS

PRINT DECRYPTED PRINT DATA

FIG.12

STORAGE MEDIUM SUCH AS FD OR CD-ROM

| DIRECTORY INFORMATION |
|---|
| PROGRAM CODE CORRESPONDING TO STEPS IN FLOWCHART OF FIG. 2 |
| PROGRAM CODE CORRESPONDING TO STEPS IN FLOWCHART OF FIG. 5 |
| PROGRAM CODE CORRESPONDING TO STEPS IN FLOWCHART OF FIG. 6 |
| PROGRAM CODE CORRESPONDING TO STEPS IN FLOWCHART OF FIG. 7 |
| PROGRAM CODE CORRESPONDING TO STEPS IN FLOWCHART OF FIG. 8 |
| PROGRAM CODE CORRESPONDING TO STEPS IN FLOWCHART OF FIG. 9 |
| PROGRAM CODE CORRESPONDING TO STEPS IN FLOWCHART OF FIG. 10 |
| PROGRAM CODE CORRESPONDING TO STEPS IN FLOWCHART OF FIG. 11 |

MEMORY MAP OF STORAGE MEDIUM

PRINTING SYSTEM, INFORMATION PROCESSING APPARATUS, PRINTING APPARATUS, PRINT MANAGEMENT METHOD, AND STORAGE MEDIUM

BACKGROUND OF THE INVENTION

1. Field of the Invention

The present invention relates to a print control method in a printing apparatus for printing data stored in a storage device detachably connectable to the printing apparatus.

2. Description of the Related Art

When a meeting is held away from the office, making print-outs in advance and carrying documents necessary for the outside meeting can be cumbersome depending on the content of the document or the number of copies required. A commonly-used method of handling documents in such a case is to store the documents as electronic data in a portable storage device having a nonvolatile storage unit, for example, an USB memory. The storage device can be connected to a printing apparatus such as a multifunction peripheral (MFP) available at a remote location. The electronic data in the storage device is accessed by the printing apparatus (i.e., the printing apparatus reads the data from the storage device) and is printed out.

For example, in Japanese Patent Application Laid-Open No. 08-244314, a host apparatus stores print data in a storage medium (i.e., removable medium) loaded into a disk drive. A printing apparatus then reads the print data stored in the storage medium and performs printing according to the print data.

In the above related art, a printing apparatus at the remote location can print any data stored in a portable storage device when connected to the printing apparatus. This means that even a user (i.e., a visitor) who is not authorized to use (or is not fit to use) a printing apparatus, can print the documents in the printing apparatus if that user has a portable storage device. As a result, a printing apparatus can be freely used or misused which lowers the security level and unnecessarily increases the number of unauthorized print-out.

SUMMARY OF THE INVENTION

An embodiment of the present invention is directed to a method of print control in a printing apparatus which can prevent free use or overuse of the printing apparatus by an unspecified user.

According to an aspect of the present invention, a printing system includes an information processing apparatus detachably connectable to a storage device, and a printing apparatus detachably connectable to the storage device. The information processing apparatus includes an encryption unit configured to encrypt data that is to be printed by the printing apparatus and stored in the storage device connected to the information processing apparatus, so that the encrypted data can be decrypted by the printing apparatus. The information processing apparatus further includes a storage unit configured to store data encrypted by the encryption unit in the storage device. The printing apparatus includes a decryption unit configured to decrypt the encrypted data that is stored in the storage device connected to the printing apparatus, and a printing unit configured to print data decrypted by the decryption unit.

According to another aspect of the present invention, an information processing apparatus detachably connectable to a storage device includes an encryption unit configured to encrypt data that is to be printed by a printing apparatus and stored in the storage device connected to the information processing apparatus, so that the encrypted data can be decrypted by the printing apparatus. The information processing apparatus further includes a storage unit configured to store data encrypted by the encryption unit in the storage device.

According to yet another aspect of the present invention, a printing apparatus detachably connectable to a storage device includes a decryption unit configured to decrypt encrypted data that is stored in the storage device connected to the printing apparatus, and a printing unit configured to print according to the data decrypted by the decryption unit. The encrypted data stored in the storage device is data encrypted by an information processing apparatus detachably connectable to the storage device, so that the encrypted data can be decrypted by the printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates a memory map of a storage medium (or a recording medium) which stores various data processing programs that can be read by each apparatus included in a printing system according to an exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
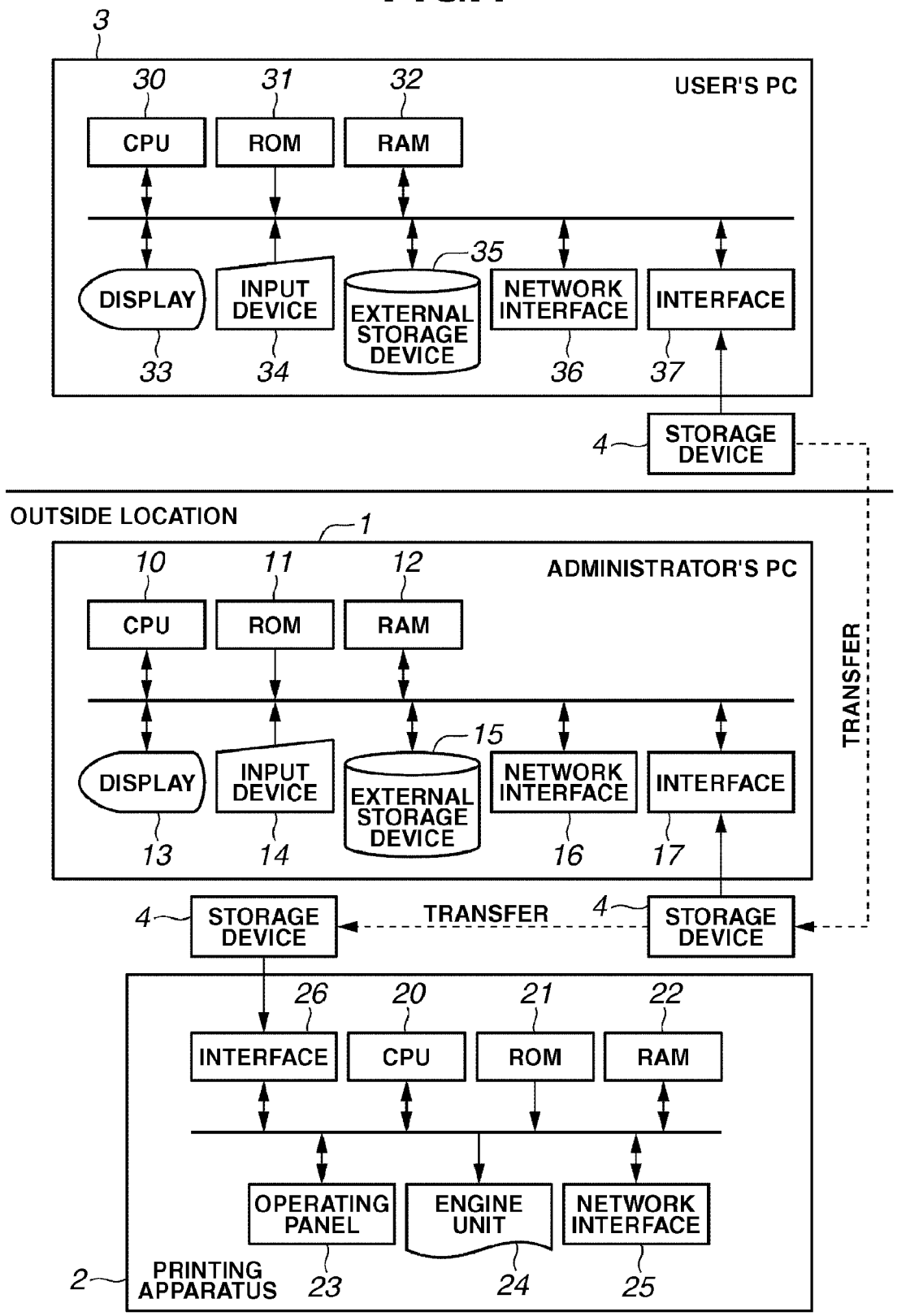
FIG. 1 illustrates a system configuration of a printing system according to an exemplary embodiment of the present invention.

FIG. 1 illustrates a system configuration of a printing system according to an exemplary embodiment of the present invention.

In FIG. 1, the printing apparatus 2 is, for example, a printer or an MFP. When the printing apparatus 2 receives and prints print data from a portable storage device 4, the printing apparatus 2 decrypts the encrypted print data stored in the storage device 4 using a secret key previously stored within the printing apparatus 2, and performs printing according to the decrypted print data.

The personal computer (PC) 1 is used by an administrator who manages a location (e.g., a company, a building, or a floor within the building or a department, in which the printing apparatus is managed according to a certain rule) where the printing apparatus 2 is set up. The PC 1 is used when a visitor from the outside brings the storage device 4 to the above location and wants to print the data inside the storage device 4 using the printing apparatus 2. For example, the visitor hands the storage device 4 to the location administrator who operates the PC 1. The PC 1 uses a secret key prepared within the PC 1 to encrypt the print data in the storage device 4 handed from the visitor.

In the present exemplary embodiment, the secret key previously stored in the printing apparatus 2 and the secret key prepared in the PC 1 by the location administrator are set as a shared secret key. As a result, only the specific print data inside the storage device brought in by a visitor (i.e., print data encrypted by the location administrator) can be printed using the printing apparatus 2 at the location.

The personal computer (PC) 3 is used by a user (or a visitor) visiting a location where the printing apparatus 2 is set up. The user's PC 3 creates print data according to the user's operation and writes the data in the storage device 4.

The storage device 4 is a portable storage device having a nonvolatile storage unit such as a USB memory.

<User's PC 3>

In the user's PC 3, a central processing unit (CPU) 30 controls the entire PC 3. A ROM 31 stores various control programs executed by the CPU 30. A RAM 32 provides a work area when the CPU 30 executes the various control programs. The CPU 30 performs various control by reading out a program stored in the ROM 31 or in the external storage device 35 onto the RAM 32 and executing the program.

A display 33 performs various displays according to the control performed by the CPU 30. An input device 34 such as a keyboard or a pointing device is used by a user to make necessary input. An external storage device 35 stores various application programs.

A network interface 36 conducts data communication with other devices on a network. The network interface is not necessarily required in the present exemplary embodiment. The storage device 4 is detachably connected to an interface 37, and data stored in the storage device 4 are read and written through the interface 37. In the case where the storage device 4 is a USB memory, the interface 37 is a USB interface.

In the PC 3, the CPU 30 executes an application program to give a print instruction. When such an instruction is given, print data created by a printer driver is stored in the storage device 4 through the interface 37.

<The Administrator's PC 1>

In the administrator's PC 1, a CPU 10, a ROM 11, a RAM 12, a display 13, a input device 14, a external storage device 15, a network interface 16, and an interface 17 correspond to the components 30 to 37 in the user's PC 3 described above, and further description about these components is omitted.

The external storage device 15 stores various control programs to be executed by the CPU 10, and a secret key 202 to be described later.

According to the present exemplary embodiment, the PC 3 stores print data in the storage device 4 which is connectable to the administrator's PC 1 as described above. The CPU 10 in the administrator's PC 1 executes a program to cause the PC 1 to read the print data stored in the storage device 4 through the interface 17. The PC 1 encrypts the read print data using the secret key 202 stored in the external storage device 15 and stores the encrypted data in the storage device 4.

<Printing Apparatus 2>

In the printing apparatus 2, a CPU 20 controls the various processes. A ROM 21 stores the control programs executed by the CPU 20, and a secret key 204 to be described later. A RAM 22 provides a work area when the CPU 20 performs various control. The RAM 22 also includes an area for expanding a raster image for printing.

An operating panel 23 is used by an user to input various commands. An engine unit 24 performs a printing process. A network interface 25 conducts data transmission with other devices on a network. An interface 26 detachably connects with the storage device 4 to read the stored data and to write data to the storage device 4. In the case where the storage device is a USB memory, the interface 26 is a USB interface.

According to the present exemplary embodiment, print data encrypted by the administrator's PC 1 is stored in the storage device 4 connected to the interface 27 of the printing apparatus 2. The CPU 20 in the printing apparatus 2 executes a program which causes the printing apparatus 2 to read the encrypted print data stored in the storage device 4 through the interface 27, decrypt the print data using the secret key 204 (shown in FIG. 4D) stored in the ROM 21, and execute a printing process.

In FIG. 1, only one user PC 3 and one printing apparatus 2 are illustrated. However, a plurality of user PCs and printing apparatuses can be employed. In addition, a plurality of PC 1 can exist. For example, a plurality of administrator's PC 1 can exist in the case where there is a plurality of printing apparatus 2 to which the different administrator is assigned.

The flow of the printing operation in the present exemplary embodiment will be described in detail below with reference to FIG. 2 to FIG. 4.

Figure 2:
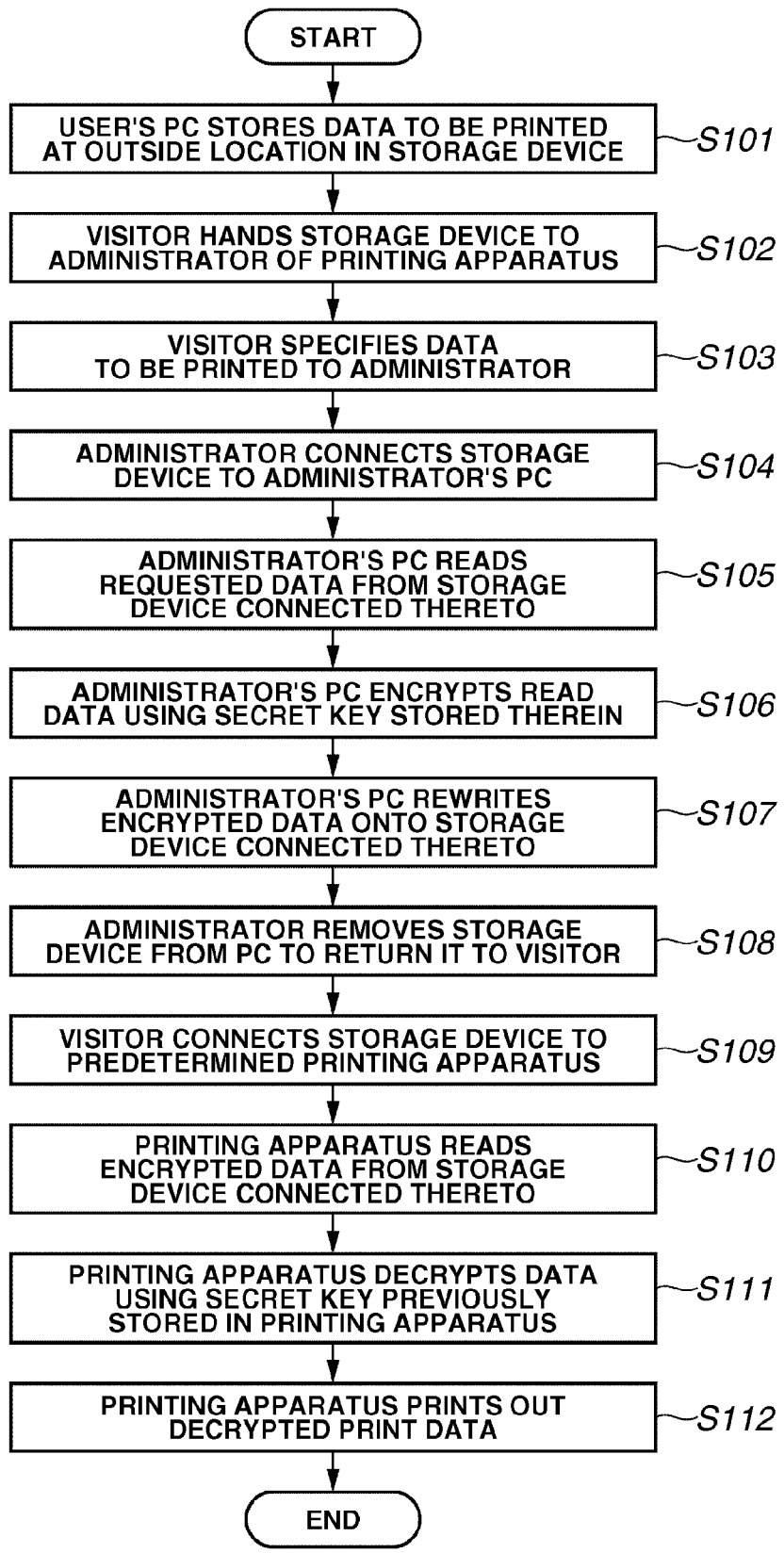
FIG. 2 is a flowchart of a printing operation according to an exemplary embodiment of the present invention.

FIG. 2 is a flowchart of the printing operation in the present exemplary embodiment. In FIG. 2, steps S101 to S112 correspond to the tasks performed by the user, the administrator, the PC 1, the PC 3, and the printing apparatus 2.

FIGS. 3A-3E and FIGS. 4A-4E are schematic views of the printing operation in the present exemplary embodiment. The FIGS. 3A-3E and FIGS. 4A-4E correspond to the tasks performed by the user, the administrator, the PC 1, the PC 3, and the printing apparatus 2.

First, the PC 3 copies the data 201 that is to be printed at a remote location, from PC 3 onto a portable storage device 4 according to an instruction from a user (visitor). The user will visit the remote location where the printing apparatus 2 is set up (step S101 in FIG. 2, FIG. 3A).

Figure 3A:
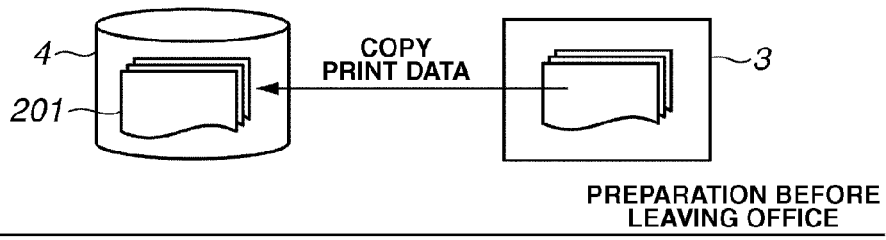
FIGS. 3A-3E are schematic views of a printing operation according to an exemplary embodiment of the present invention.
Figure 3B:
Figure 3C:
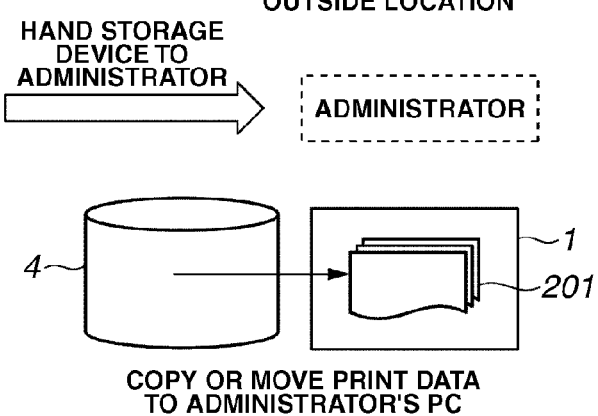
Figure 3D:
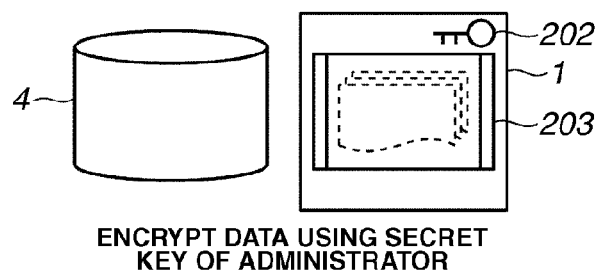
Figure 3E:
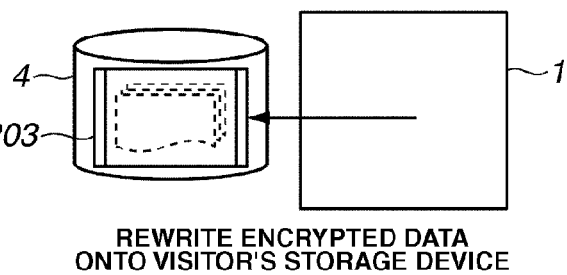

At the remote location, the visitor delivers the storage device 4 into which the print data has been written in step S101, to the administrator of the printing apparatus 2 (step S102 in FIG. 2, FIG. 3D). The visitor informs the administrator which data in the storage device 4 is to be printed (step S103 in FIG. 2).

The administrator connects the portable storage device 4 received from the visitor to the PC 1 which is used to manage the printing apparatus 2 (step S104 in FIG. 2). The PC 1 copies or moves the print data 201 specified by the visitor, from the storage device 4 to the PC 1 according to the administrator's instruction (step S105 in FIG. 2, FIG. 3C).

The PC 1 encrypts the print data 201 using the shared secret key 202 which is previously stored in the PC 1 (step S106 in FIG. 2, FIG. 3D). The PC 1 then writes the encrypted data 203 as shown in FIG. 3 onto the storage device 4 connected to the PC 1 according to the administrator's instruction (step S107 in FIG. 2, FIG. 3E).

Figure 4A:
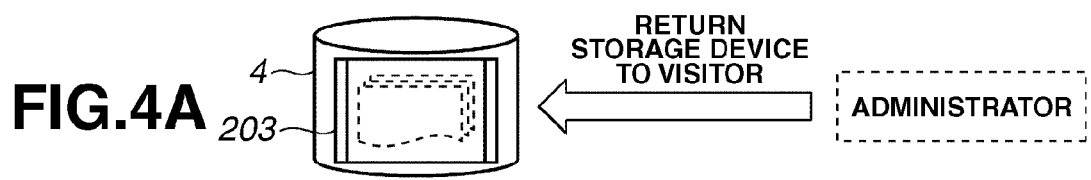
FIGS. 4A-4E are schematic views of a printing operation according to an exemplary embodiment of the present invention.
Figure 4B:
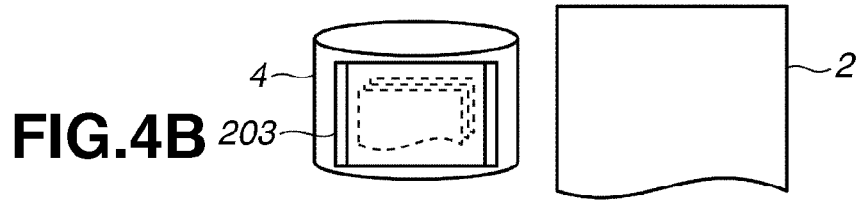

The administrator returns the storage device 4 onto which the encrypted data 203 has been written, to the visitor (step S108 in FIG. 2, FIG. 4A). The visitor connects the returned storage device 4 to the printing apparatus 2 (step S109 in FIG. 2, FIG. 4B). The printing apparatus 2 can be specified by the administrator or can be any printing apparatus 2 at the visiting location.

Figure 4C:
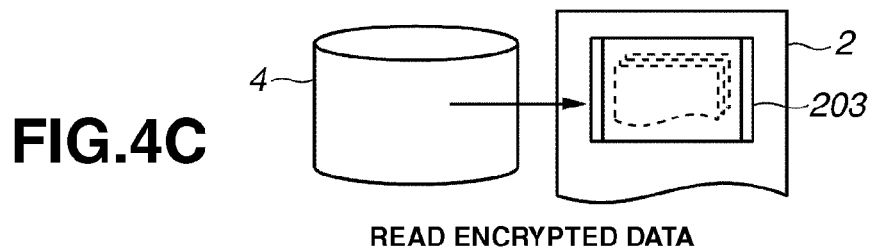
Figure 4D:
Figure 4E:
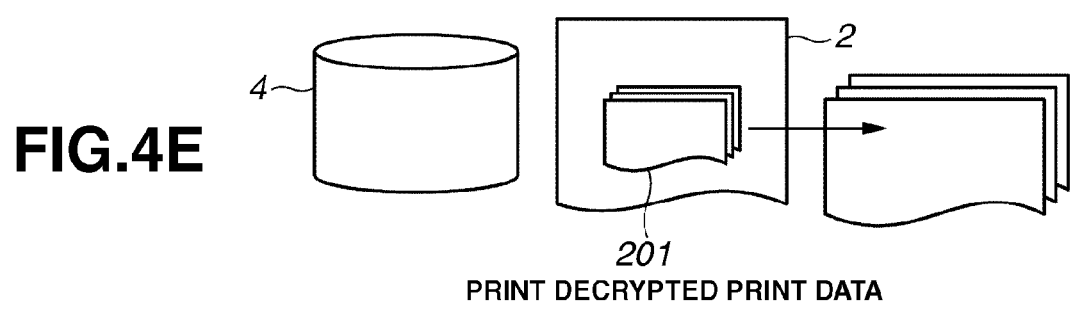

Upon connection of the storage device 4, the printing apparatus 2 reads the encrypted data 203 from the storage device 4 (step S110 in FIG. 2, FIG. 4C). The printing apparatus 2 decrypts the read data using the shared secret key 204 which is previously stored in the ROM 21 of the printing apparatus 2 (step S111 in FIG. 2, FIG. 4D). The printing apparatus prints out the decrypted data, i.e., the print data 201 (step S112 in FIG. 2, FIG. 4E).

By performing such printing operation, only the print data which is encrypted by the shared secret can be correctly printed by the printing apparatus 2. Unless the print data stored in the storage device 4 is encrypted by the shared secret key which is previously stored in the PC, an improper decrypting process will be performed in step Sill, and a correct print-out based on the print data cannot be obtained. In addition, the visitor specifies the data that is to be printed, to the administrator who instructs the PC 1 to encrypt the data. Accordingly, the visitor cannot freely add print data which the visitor wishes to print.

The processes performed in the user's PC 3, the administrator's PC 1, and the printing apparatus 2 in the present exemplary embodiment will be described below with reference to FIG. 5 to FIG. 7.

Figure 5:
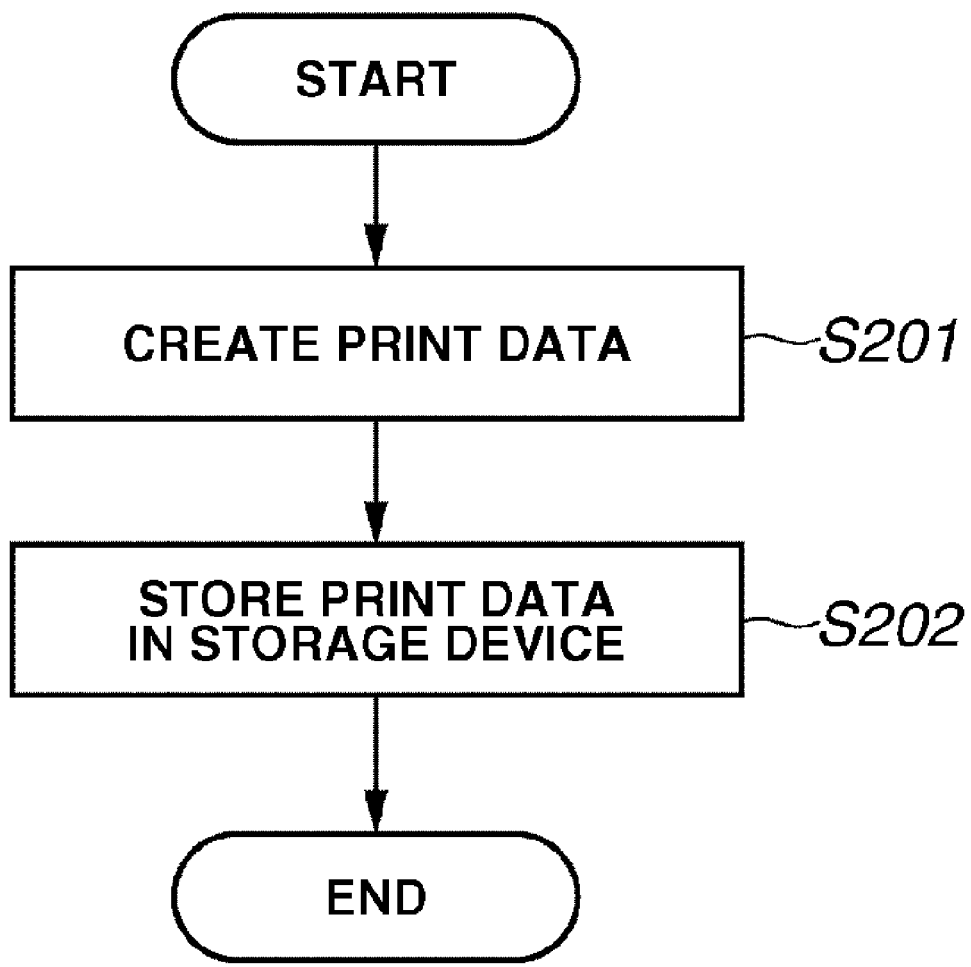
FIG. 5 is a flowchart of a control process according to an exemplary embodiment of the present invention.

FIG. 5 is a flowchart of the control process in the first exemplary embodiment and corresponds to the print data storage process on the user's PC 3. The CPU 30 in the PC 3 of FIG. 1 performs the process of the flowchart by reading out a program stored in the external storage device 35 onto the RAM 32 and executing the program.

First, a user inputs an instruction into the PC 3 to create print data and store the print data in the storage device 4. In step S201, the CPU 30 performs control so that an application program and a printer driver program create the print data. The application program creates document data according to an operation by the user, and the printer driver converts the document data to print data. In the case where a printing apparatus can directly print out the document data created by the application program, the document data itself can be treated as the print data.

In step S202, the CPU 30 performs control to store the print data created in step S201 in the storage device 4 that is connected to the interface 37, and ends the process.

In the above case, the print data is created in step S201. However, if the print data is previously created, the following process is performed. When the user gives an instruction to store the print data into the storage device 4, the CPU 30 performs control to store the print data into the storage device 4 in step S202, and ends the process.

The print data stored in the storage device 4 can be a prn file, postscript file, PDF file, or of any other print data file format which the printing apparatus 2 can understand.

Figure 6:
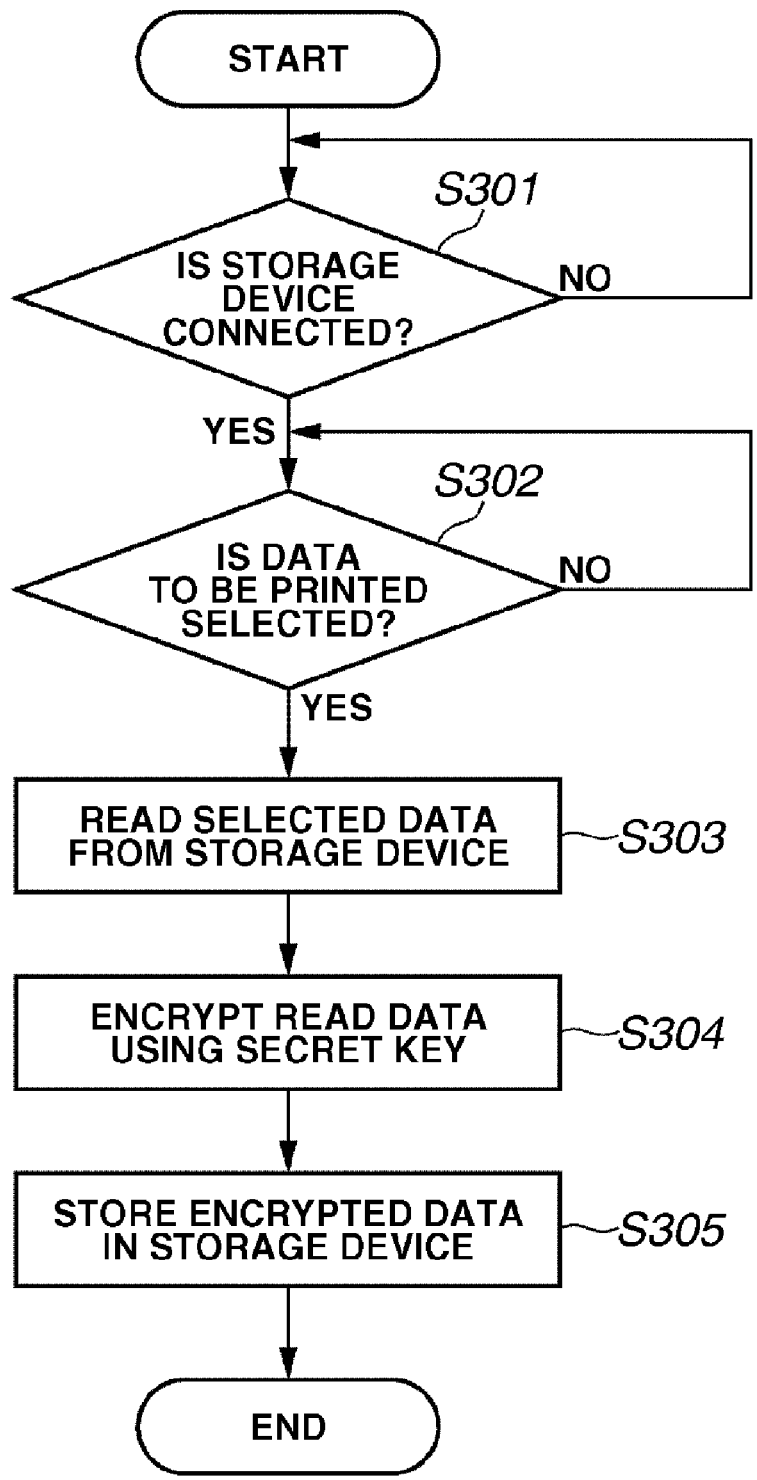
FIG. 6 is a flowchart of another control process according to an exemplary embodiment of the present invention.

FIG. 6 is a flowchart illustrating another control process in the first exemplary embodiment and corresponds to the process of encrypting print data in the administrator's PC 1. The CPU 10 in the PC 1 performs the process by reading out a program stored in the external storage device onto the RAM 21 and executing the program.

First, the administrator instructs the administrator's PC to encrypt print data. In step S301, the CPU 10 determines whether the storage device 4 is connected to the interface 17. In the case where the CPU 10 determines that the storage device 4 is not connected to the interface 17, the CPU 10 performs control to display a message on the display 13 urging the user to connect the storage device 4 (this step is not shown) and waits for the connection. On the other hand, in the case where the CPU 10 determines that the storage device 4 is connected to the interface 17, the process proceeds to step S302.

In step S302, the CPU 10 performs control to display a message on the display 13 urging the user to select and input the print data. The CPU 10 determines whether the selection and input of the print data have been made. When the CPU 10 detects the selection and the input of the data, the process proceeds to step S303.

In step S303, the CPU 10 performs control to read the data selected in step S302 from the storage device 4 onto the RAM 12.

In step S304, the CPU 10 performs control to encrypt the data read in step S303 using a secret key previously stored in the storage device 4.

In step S305, the CPU 10 performs control to store the data encrypted in step S304, into the storage device 4, and ends the process.

Figure 7:
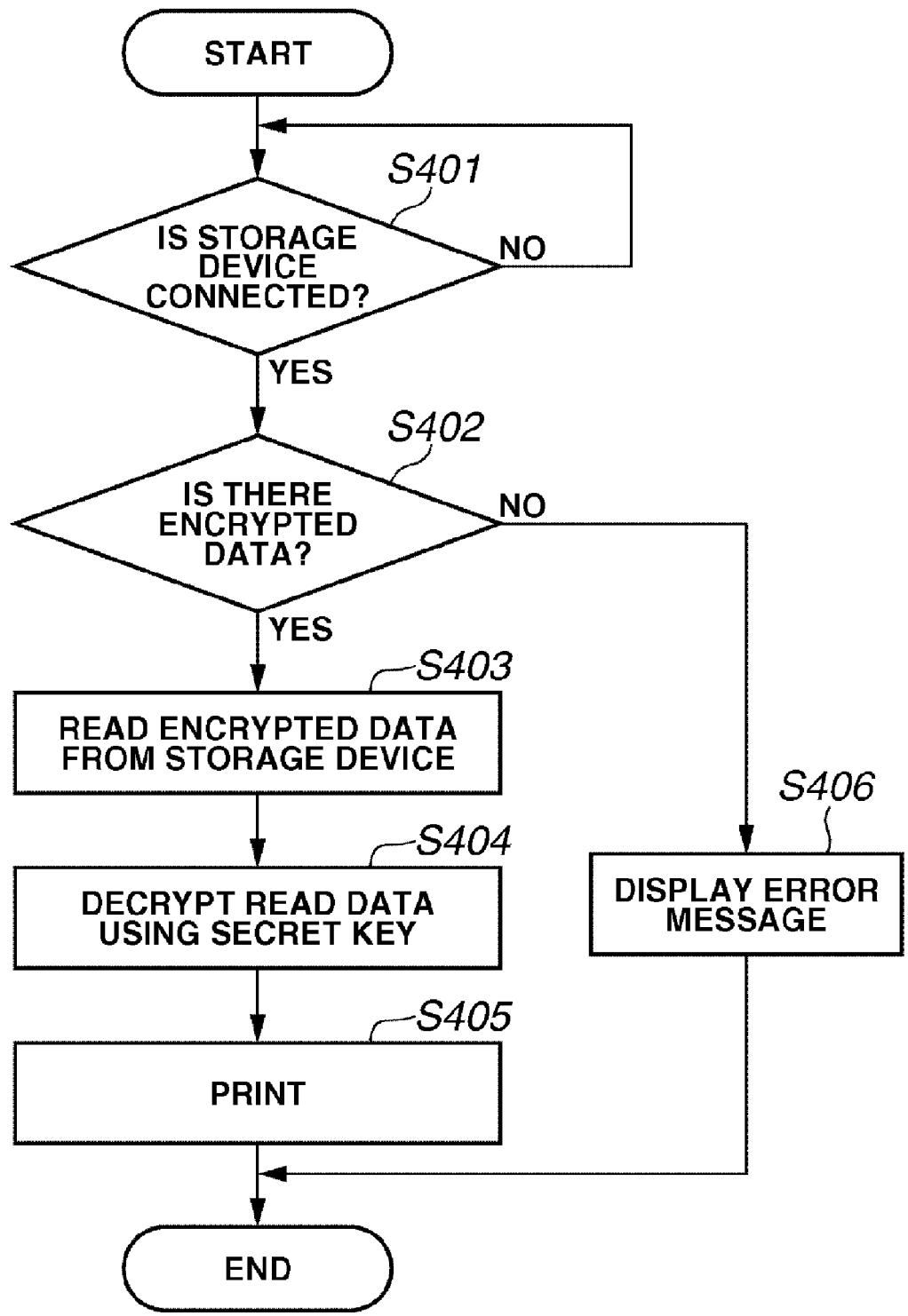
FIG. 7 is a flowchart of another control process according to an exemplary embodiment of the present invention.

FIG. 7 is a flowchart of another control process in the present exemplary embodiment and corresponds to the printing process in the printing apparatus 2. The CPU 20 in the printing apparatus 2 performs the process by reading and executing a program stored in the ROM 21.

First, the user gives an instruction to print the print data. In step S401, the CPU 20 determines whether the storage device 4 is connected to the interface 26. In the case where the CPU 20 determines that the storage device 4 is not connected to the interface 26, the CPU 20 performs control to display a message on a display in the operating panel 23 urging the user to connect the storage device (this step is not shown), and waits for the connection. On the other hand, in the case where the CPU 20 determines that the storage device 4 is connected to the interface 26, the process proceeds to step S402.

In step S402, the CPU 20 determines whether encrypted data exists in the storage device 4. In the case where the CPU 20 determines that there is no encrypted print data, the CPU 20 performs control to display an error message on the display on the operating panel 23 in step S406 and ends the process. In the case where the CPU 20 determines that the encrypted data exists, the process proceeds to step S403.

In step S403, the CPU 20 performs control to read the encrypted data from the storage device 4 onto the RAM 22.

In step S404, the CPU 20 performs control to decrypt the read encrypted data using the secret key previously stored in the ROM 21.

In step S405, the CPU 20 performs control to print the data decrypted in step S404, i.e., the print data created in step S201 of FIG. 5, and ends the process.

In step S403, the CPU 20 can perform control to delete the encrypted data from the storage device 4 after the data is read onto the RAM 22. Alternatively, in step S404, the CPU 20 can perform control to delete the corresponding encrypted data from the storage device 4 after the data has been decrypted.

Furthermore, in step S405, the CPU 20 can perform control to delete the encrypted data corresponding to the printed data from the storage device 4 after the printing process is completed. By deleting the encrypted data from the storage device 4 as above, unnecessary printing of the encrypted data stored in the storage device 4 can be avoided.

In addition, in the case where the encrypted data is deleted from the storage device 4 in step S403 or in step S404 as described above, the CPU 10 can store the encrypted data read out from the storage device 4 in the RAM 12 until the decrypted data corresponding to the encrypted data is printed out. Furthermore, in the case where a part of the data is not printed out for some reason in step S405, the CPU 20 can perform control to return the encrypted data corresponding to the data that is not printed, from the RAM 12 to the storage device 4.

As described above, according to the present exemplary embodiment, when the print data is carried to an outside location, a portable storage device 4 having a nonvolatile storage unit can be carried with ease. In addition, the printing apparatus cannot be freely used or misused by an unspecified user, and security management will become better and easier.

In the above exemplary embodiment, a secret key previously stored in the printing apparatus 2 and a secret key prepared in the administrator's PC 1 are a shared secret key. However, the two secret keys can be different ones provided that the keys are a pair so that the data encrypted by the secret key of the PC 1 can be decrypted by the secret key of the printing apparatus 2.

Second Exemplary Embodiment

The first exemplary embodiment describes a case where the common secret keys previously stored in the administrator's PC 1 and the printing apparatus 2 are of the same type. However, alternatively, a plural secret keys for each of printing apparatuses can be stored in the PC 1, while only one type among the plural secret keys in the PC 1 is stored in each of the printing apparatuses 2. Furthermore, a secret key can be prepared for each department, and depending on the department which a visitor visits, an administrator can use an appropriate secret key. Furthermore, in the case where a different administrator is assigned to each printing apparatus, the secret key corresponding to the respective printing apparatus can be stored in the PC of the administrator managing that printing apparatus.

Figure 8:
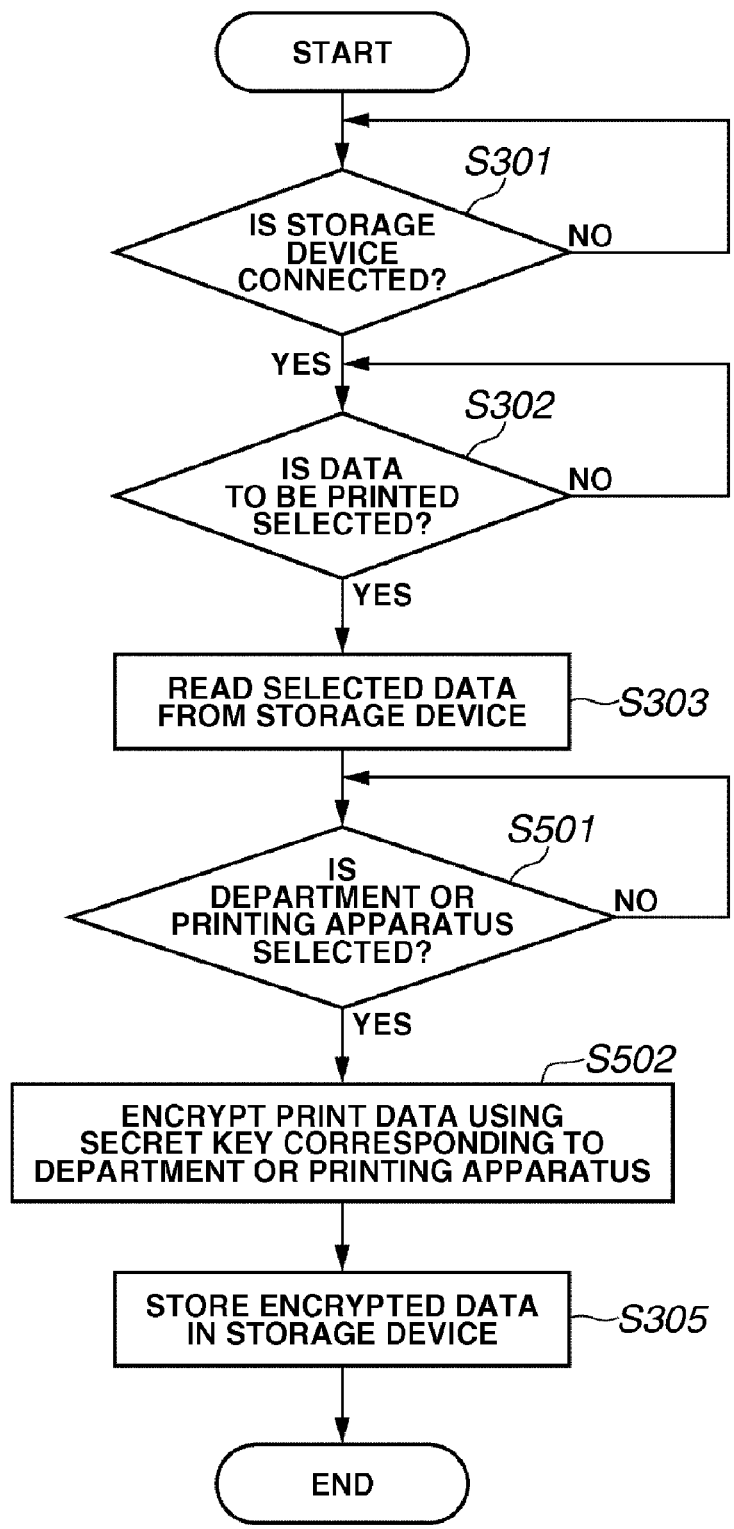
FIG. 8 is a flowchart of another control process according to an exemplary embodiment of the present invention.

FIG. 8 is a flowchart of the control process in the second exemplary embodiment and corresponds to the print data encryption process in the administrator's PC 1. The CPU 10 in the PC 1 shown in FIG. 1 performs this process by reading out a program stored in the external storage device 15 onto the RAM 12 and executing the program. The steps that are the same as FIG. 6 have the same step numbers. Since the steps S301 to S303 are the same as FIG. 6, description of these steps is omitted.

In step S501, the CPU 10 performs control to display a message on the display 13 urging a user to select and input a department that a visitor is visiting or a printing apparatus to be used for printing. The CPU 10 determines whether the department or the printing apparatus has been selected and input. When the CPU 10 detects the selection and input, the process proceeds to step S502.

In step S502, the CPU 10 performs control to encrypt the data read in step S303 using a secret key (i.e., one of the keys previously stored in the external storage device 15) corresponding to the department or the printing apparatus selected in step S501.

In step S305, the CPU 10 performs control to store the data encrypted in step S504 into the storage device 4, and ends the process. On the other hand, the printing apparatus 2 previously stores a secret key corresponding to the printing apparatus 2 or corresponding to the department to which the printing apparatus 2 belongs. In step S404 of FIG. 7, the encrypted data is decrypted using such secret key.

In the above configuration, an administrator appropriately uses plural secret keys and restricts the printing apparatus 2 that a visitor can use because data encrypted by a secret key corresponding to a printing apparatus A cannot be decrypted by a different printing apparatus B. In addition, the number of print-outs made in a printing apparatus can be managed by each department when a visitor uses the printing apparatus.

Third Exemplary Embodiment

In addition to the first and second exemplary embodiments, print settings such as the print layout, paper type, print quality, finishing, e.g., duplex and one-sided printing, and number of printouts can be made on the side of the administrator's PC 1. In this configuration, the administrator makes the above print settings on the PC 1 based on the visitor's request. The PC 1 then creates print setting data, encrypts the print setting data and the print data, and stores the encrypted data into the storage device 4. The printing apparatus 2 decrypts the print setting data and the print data, and pints out the print data according to the print setting data.

Figure 9:
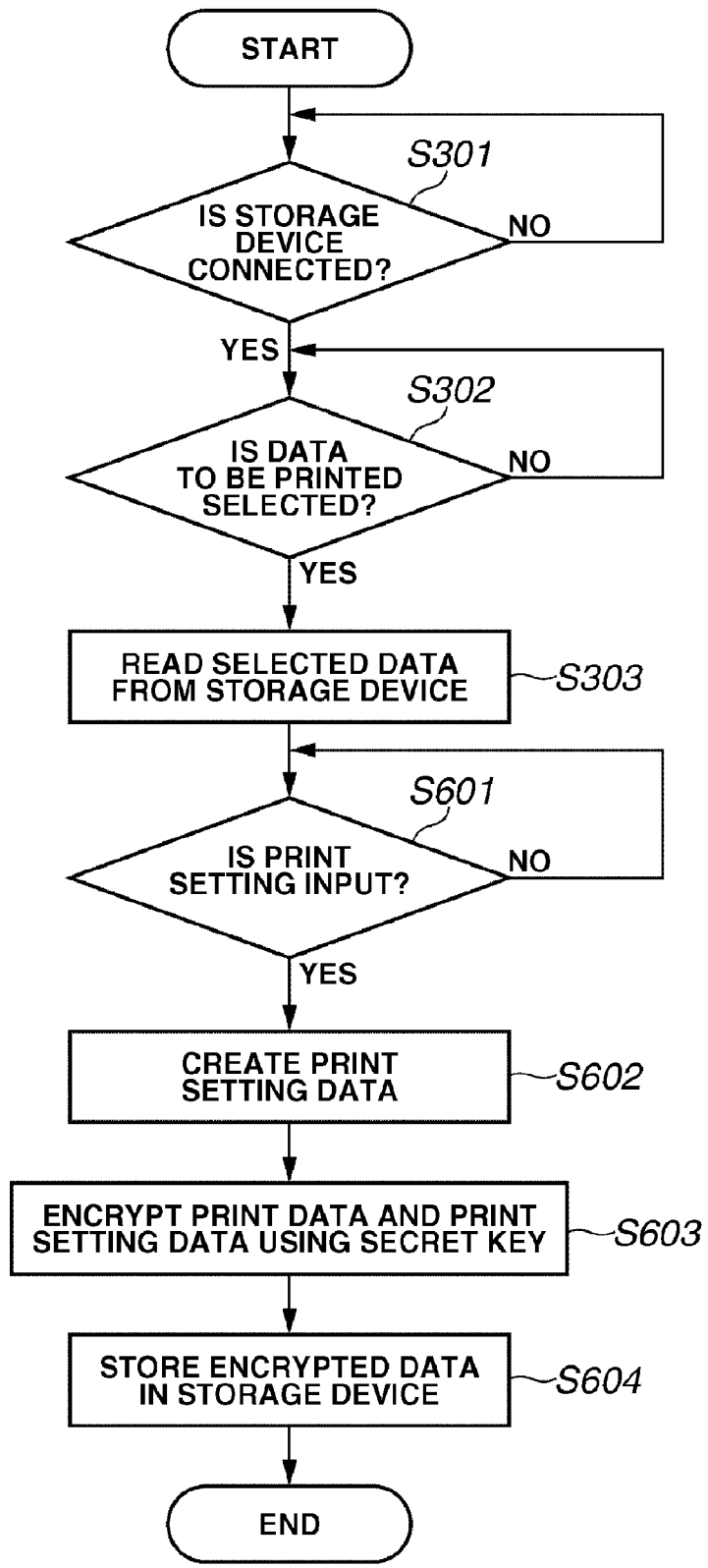
FIG. 9 is a flowchart of another control process according to an exemplary embodiment of the present invention.

FIG. 9 is a flowchart of the control process in the third exemplary embodiment which corresponds to the print data encryption process in the administrator's PC 1. The CPU 10 in the PC 1 shown in FIG. 1 performs the process by reading out the program stored in the external storage device 15 onto the RAM 12 and executing the program. The steps that are the same as FIG. 6 have the same step numbers. Since the steps S301 to S303 are the same as FIG. 6, description of these steps is omitted.

In step S601, the CPU 10 performs control to display a message on the display 13 urging a user to input print setting (e.g., print layout such as 2 in 1, paper type, print quality, finishing such as duplex and one-sided printing, and number of print-outs). The CPU 10 determines whether the above input of the print setting is made. When the CPU 10 detects the input in step S601, the process proceeds to step S602. The print setting can be input to each print data or a common print setting can be input to all print data. Alternatively, the input of the print setting can be cancelled and the process can proceed to step S602 without making any print setting.

In step S602, the CPU 10 creates print setting data based on the print setting input in step S601.

In step S603, the CPU 10 performs control to encrypt the print data read in step S303 and the print setting data created in step S602 using a secret key previously stored in the external storage device 15. The print data and the print setting data can be created into one encrypted file or into separate encrypted files. In the case where the print data and the print setting data are created into separate files, the print data and the print setting data are bound together, for example, by file names.

In step S604, the CPU 10 performs control to store the encrypted print data and the print setting data into the storage device 4, and ends the process.

Figure 10:
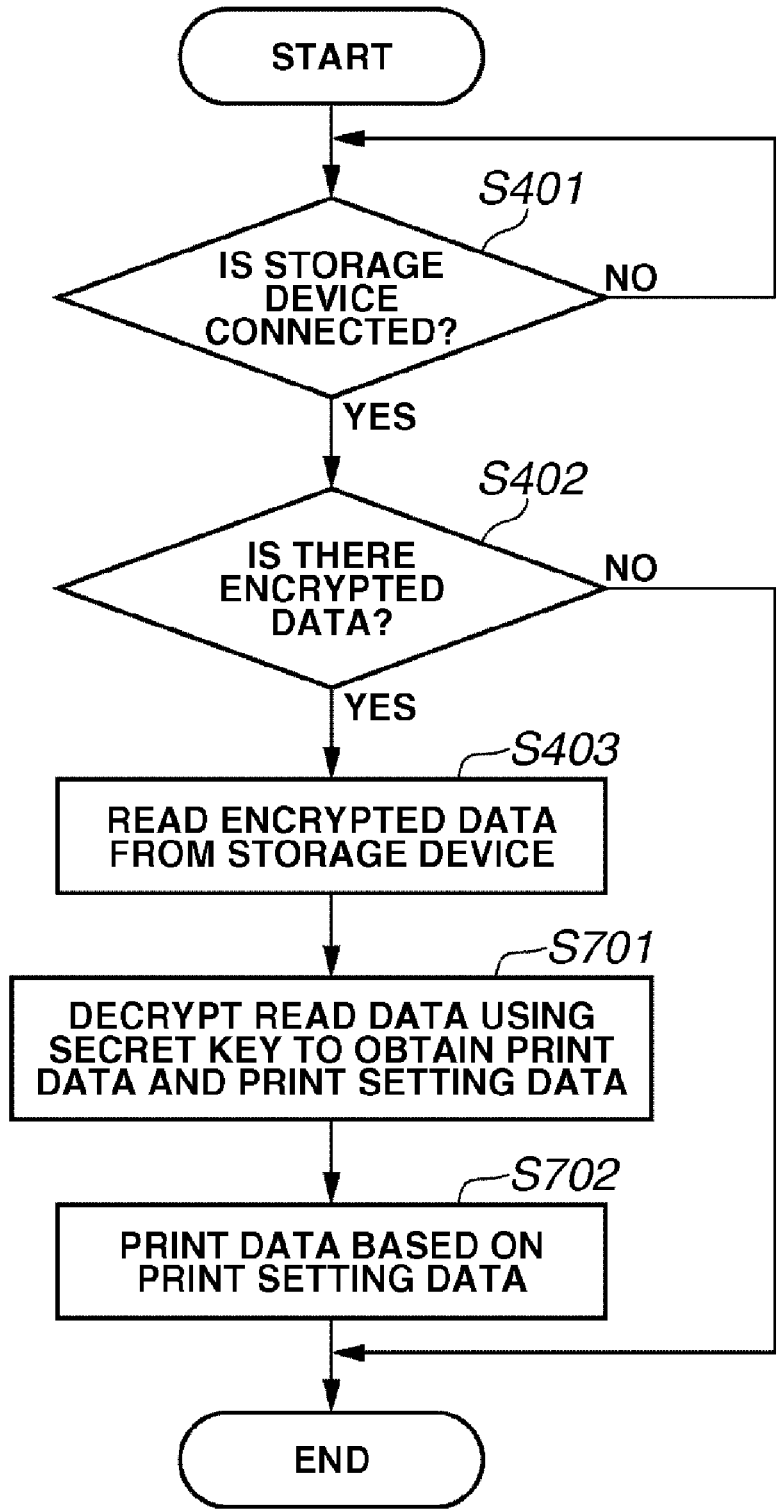
FIG. 10 is a flowchart of another control process according to an exemplary embodiment of the present invention.

FIG. 10 is a flowchart of another control process in the third exemplary embodiment and corresponds to the printing process in the printing apparatus 2. The CPU 20 in the printing apparatus 2 shown in FIG. 1 performs the process by reading and executing a program stored in the ROM 21. The steps that are the same as FIG. 7 have the same step numbers. Since the steps S401 to S403 are the same as FIG. 7, description of these steps is omitted.

In step S701, the CPU 20 performs control to decrypt the encrypted data read in step S403 using a secret key previously stored in the ROM 21 to obtain the print data and the print setting data.

In step S702, the CPU 20 performs control to print out the print data according to the print setting data obtained in step S701, and ends the process.

As described above, according to the present exemplary embodiment, an administrator makes print setting and the PC 1 encrypts the print setting data. Thus, an unspecified user (visitor) cannot use the printing apparatus by freely making print settings. As a result, free use or misuse of the printing apparatus can be prevented, and the security management of the printing apparatus will become better and easier.

Fourth Exemplary Embodiment

The third exemplary embodiment describes a configuration in which an administrator makes print settings on the PC 1 based on the visitor's request, and the PC 1 encrypts both the print setting data and the print data, and stores the data into the storage device 4. The fourth exemplary embodiment of the present invention describes a configuration in which only a certain print setting item (e.g., only the print layout such as 2 in 1 or the finishing setting such as duplex and one-sided printing) among the print setting can be changed by the printing apparatus 2.

Figure 11:
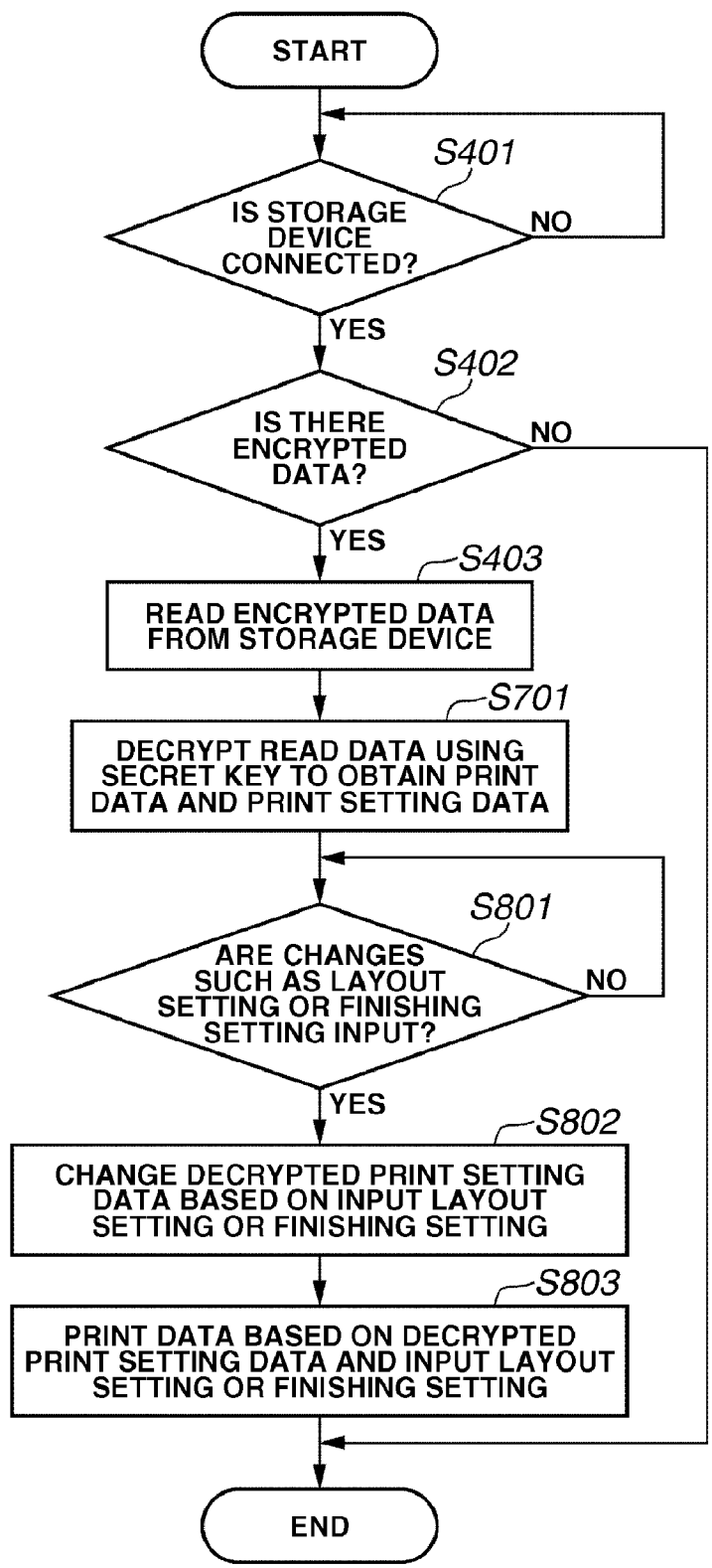
FIG. 11 is a flowchart of another control process according to an exemplary embodiment of the present invention.

FIG. 11 is a flowchart of another control process in the fourth exemplary embodiment and corresponds to the printing process in the printing apparatus 2. The CPU 20 in the printing apparatus 2 shown in FIG. 1 performs the process by reading and executing a program stored in the ROM 21. The steps that are the same as FIG. 7 and FIG. 10 have the same step numbers. Since the steps S401 to S403 and S701 are the same as FIG. 7, description of these steps is omitted.

In step S801, the CPU 20 performs control to display a message on the operating panel 23 urging a user to input print setting, e.g., print layout such as 2 in 1, or finishing such as duplex and one-sided printing. The CPU 20 determines whether the above print setting is input. When the input in step S801 is detected, the CPU 20 changes the print setting data obtained in step S701 according to the input setting, and the process proceeds to step S803. Alternatively, the process can proceed to step S803 by canceling the input setting.

In step S803, the CPU 20 performs control to print out the print data obtained in step S701 according to the print setting data changed in step S802, and ends the process.

As described above, according to the present exemplary embodiment, an administrator makes print setting so that an unspecified user (visitor) will not be able to use the printer apparatus such as MFP by freely making print setting. As a result, free use or misuse of the printing apparatus will be prevented, and security management will become better and easier. In addition, the visitor can freely change only the print layout setting and the finishing setting in the printing apparatus. Consequently, the administrator can set on his side the number of copies or the type of paper to be printed, and flexible print setting management can be realized.

Fifth Exemplary Embodiment

Instead of a personal computer (PC 3) in the above exemplary embodiments, the apparatus 3 used by a user can be an imaging equipment such as a digital camera or a camera phone. In such a case, the storage device 4 can be a recording medium which connects with the digital camera or the camera phone, or can be the digital camera or the camera phone itself. The print data stored in the storage device 4 is an image data such as JPEG. The printing apparatus 2 reads the encrypted image data from the storage device 4, decrypts the data, and performs a printing process.

According to each of the exemplary embodiments described above, a visitor brings a portable storage device such as a USB memory to an outside location, and an administrator of the location encrypts the data which may be printed, and stores the encrypted data inside the storage device, using a secret key. When the storage device is connected to a printer apparatus 2 set up in the location, the printer apparatus 2 decrypts the data in the storage device using a secret key previously stored in the apparatus and performs a printing process.

In the above configuration, a user can carry print data with ease to an outside location using a portable storage device such as a USB memory having a nonvolatile storage unit. An unspecified user will not be able to use the printing apparatus at the outside location. Accordingly, security management and management of the number of copies made by the printing apparatus becomes better and easier. That is, the printing apparatus can be managed such that, if a user connects a storage device to the printing apparatus as he pleases (without the permission of the administrator), the user cannot make print-outs. Therefore, the above exemplary embodiments provides an effective management method in the case where a print data stored in a portable storage device 4 brought by a visitor, is printed by a printing apparatus 2 at an outside location.

Other Exemplary Embodiments

The printing apparatus 2 can utilize a laser beam printing method or other electrophotographic methods such as an LED method. In addition, the present invention is applicable to other printing methods such as a liquid crystal shutter method, an inkjet method, a heat transfer method, or a dye sublimation method.

The present invention can be embodied as, for example, a system, an apparatus, a method, a program, or a storage medium. Further, the present invention can be applied to a system including a plurality of devices or to an apparatus of a single device. As above described, when a user prints the data recorded in the portable storage device which he brings, free use or misuse of the printing apparatus by the user can be easily prevented.

FIG. 12 illustrates a memory map of a storage medium (a recording medium) storing various software that can be read by each apparatus (e.g., PC 1, printing apparatus 2, and PC 3 as shown in FIG. 1) of the printing system according to the exemplary embodiment of the present invention. In addition, although not shown, information for managing software stored in the storage medium, e.g., version or creator, and information relying on an operating system of a computer which reads out the software (e.g., icon for identifying the programs, etc.) can be stored in the storage medium.

Furthermore, data ancillary to the various programs is managed in directories of the storage medium. In addition, programs for installing the various programs in computers or for decompressing compressed programs can be stored in the storage medium.

The functions illustrated in FIG. 5 to FIG. 11 can be implemented by a host computer executing a program installed from an outside source. A group of information including a program can be supplied to an information processing apparatus from a storage device such as a compact disk-read-only-memory (CD-ROM), flash memory, or floppy disk, or from an external storage device through a network.

A storage medium which stores software (program code) for realizing the operations of the above-described exemplary embodiments can be supplied to a system or an apparatus. The present invention can also be implemented by causing the computer (CPU or micro-processing unit (MPU)) of the system or the apparatus to read out and execute programs stored in the storage medium.

In such a case, the software (program code) itself realizes the novel functions of the invention. Such programs can take any form, for example, object code, a program executed by an interpreter, or script data supplied to an OS. The storage medium can be, for example, a flexible disk, hard disk, optical disk, magnetic optical disk, CD-ROM, magnetic tape, non-volatile memory card, ROM, or digital versatile disk (DVD).

Such programs can also be supplied by the system or the apparatus accessing a web page on the Internet through the browser of a client computer. The program itself or a compressed file including an auto-install function can be downloaded from the web page onto a storage medium such as a hard disk. In addition, the program code can be broken up into a plurality of files, and each file can be downloaded from different web pages. The present invention can also be applied to WWW servers or FTP servers that allow plural users to download the program files so that the functions or processes of the present invention can be realized on their computers.

Furthermore, such program code can be encrypted and stored in a storage medium such as a CD-ROM to be distributed to users. A user who meets the predetermined conditions can download the key information for decrypting the program from a web page through the Internet. By using the key information, the encrypted program can be executed and be installed in a computer to realize the functions of the present invention.

Furthermore, based on an instruction of the program, the operating system (OS) running on the computer may execute part or all of the processing so that the functions of the above-described embodiments can be realized.

Furthermore, the supplied program code can be stored in a memory equipped in a function enhancement board of the computer or a function enhancement unit connected to the computer, and a CPU in the function enhancement board or the function enhancement unit can executes all or part of the processing based on the instructions of the program code to realize the operations of the embodiments. The present invention may be applied to a system comprised of plural pieces of equipment or to an apparatus comprised of one piece of equipment. The present invention may be implemented by supplying a system or an apparatus with a program. In such a case, a storage medium in which a program code of software is stored that realizes the present invention, can be read by the system or apparatus to achieve the effect of the present invention.

According to the present invention, when the print data is carried to an outside location, the use of a portable storage device makes it convenient for a user to carry print data. In addition, free use or misuse of the printing apparatus by an unspecified user can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-014195 filed Jan. 23, 2006, which is hereby incorporated by reference herein in its entirety.

What is claimed is:

1. A printing system comprising:
an information processing apparatus detachably connectable to a storage device for storing data to be printed; and
a printing apparatus to which a user can connect the storage device,
wherein the information processing apparatus includes:
a print setting unit configured to generate print setting data indicating a first print setting which can be changed by the user at the printing apparatus and a second print setting which is set by an administrator at the information processing apparatus and cannot be changed by the user at the printing apparatus;
an encryption unit configured to encrypt data to be printed and the print setting data generated by the print setting unit; and
a storing unit configured to store, in the storage device connected to the information processing apparatus, the data to be printed and the print setting data encrypted by the encryption unit; and
wherein the printing apparatus includes:
a decryption unit configured to, if the user connects the storage device to the printing apparatus, decrypt the encrypted data to be printed and the encrypted print setting data that are stored in the storage device connected to the printing apparatus;
a changing unit configured to enable the user to change the first print setting indicated by the print setting data decrypted by the decryption unit, without changing the second print setting indicated by the print setting data decrypted by the decryption unit; and
a printing unit configured to print the data to be printed decrypted by the decryption unit in accordance with the first print setting which is changed by the changing unit and the second print setting which is not changed by the changing unit.

2. The printing system according to claim 1, wherein the storage device comprises an external storage device detachably connectable to an external port of the information processing apparatus, and
wherein the external storage device is detachably connectable to an external port of the printing apparatus.

3. The printing system according to claim 1, wherein the printing apparatus includes a prohibiting unit configured to perform control to prohibit printing of unencrypted data stored in the storage device connected to the printing apparatus, by the printing unit.

4. The printing system according to claim 1, wherein key data used by the encryption unit for encrypting and key data used by the decryption unit for decrypting are the same.

5. The printing system according to claim 1, wherein key data used by the encryption unit for encrypting and key data used by the decryption unit for decrypting are different but paired with each other.

6. The printing system according to claim 1, wherein the encryption unit encrypts print data using one key data selected from a plurality of key data, and
wherein the decryption unit decrypts the print data using the one key data set previously.

7. The printing system according to claim 6, wherein the key data selected from the plurality of key data is provided for each department or for each printing apparatus, and
wherein the information processing apparatus includes a selection unit configured to select the key data corresponding to a selected department or a selected printing apparatus from the plurality of key data.

8. The printing system according to claim 1, wherein the information processing apparatus further includes a storage unit configured to store key data used by the encryption unit for encrypting.

9. The printing system according to claim 1, wherein the printing apparatus includes a deletion unit configured to delete the encrypted data stored in the storage device from the storage device, after reading the encrypted data, or after decryption of the encrypted data.

10. The printing system according to claim 9, wherein the encrypted data is retained in a memory until the printing unit completes printing, and
  wherein the deletion unit performs control to store in the storage device encrypted data corresponding to data which was not printed by the printing unit and is retained in the memory.

11. The printing system according to claim 1, wherein the printing apparatus includes a deletion unit configured to perform control to delete encrypted data stored in the storage device after the decrypted data corresponding to the encrypted data is printed.

12. The printing system according to claim 1, wherein the storage device comprises one of a removable memory, a digital camera, and a cellular phone.

13. A printing apparatus detachably connectable to a storage device for storing data to be printed, the printing apparatus comprising:
  a decryption unit configured to, if a user connects the storage device to the printing apparatus, decrypt encrypted data to be printed and encrypted print setting data indicating a first print setting which can be changed by the user at the printing apparatus and a second print setting which is set by an administrator at an information processing apparatus detachably connectable to the storage device and cannot be changed by the user at the printing apparatus, the encrypted data to be printed and the encrypted print setting data being stored in the storage device connected to the printing apparatus and being data encrypted by the information processing apparatus;
  a changing unit configured to enable the user to change the first print setting indicated by the print setting data decrypted by the decryption unit, without changing the second print setting indicated by the print setting data decrypted by the decryption unit; and
  a printing unit configured to print the data to be printed which is decrypted by the decryption unit in accordance with the first print setting which is changed by the changing unit and the second print setting which is not changed by the changing unit.

14. A method in a printing system including an information processing apparatus detachably connectable to a storage device for storing data to be printed and a printing apparatus to which a user can connect the storage device, the method comprising:
  generating, by the information processing apparatus, print setting data indicating a first print setting which can be changed by the user at the printing apparatus and a second print setting which is set by an administrator at the information processing apparatus and cannot be changed by the user at the printing apparatus;
  encrypting, by the information processing apparatus, data to be printed and the generated print setting data;
  storing, by the information processing apparatus, the encrypted data to be printed and the encrypted print setting data in the storage device connected to the information processing apparatus;
  decrypting, by the printing apparatus, the encrypted data to be printed and the encrypted print setting data that are stored in the storage device connected to the printing apparatus, if the user connects the storage device to the printing apparatus;
  enabling, by the printing apparatus, the user to change the first print setting indicated by the decrypted print setting data, without changing the second print setting indicated by the decrypted print setting data; and
  printing, by the printing apparatus, the decrypted data to be printed in accordance with the first print setting which is changed and the second print setting which is not changed.

15. A method in a printing apparatus detachably connectable to a storage device for storing data to be printed, the method comprising:
  decrypting, if a user connects the storage device to the printing apparatus, encrypted data to be printed and encrypted print setting data for printing data stored in the storage device indicating a first print setting which can be changed by the user at the printing apparatus and a second print setting which is set by an administrator at an information processing apparatus detachably connectable to the storage device and cannot be changed by the user at the printing apparatus, the encrypted data to be printed and the encrypted print setting data being stored in the storage device connected to the printing apparatus and being data encrypted by the information processing apparatus;
  enabling the user to change the first print setting indicated by the decrypted print setting data, without changing the second print setting indicated by the decrypted print setting data; and
  printing the decrypted data to be printed in accordance with the first print setting which is changed and the second print setting which is not changed.

16. A non-transitory computer-readable storage medium storing a computer program for controlling a printing apparatus detachably connectable to a storage device for storing data to be printed, the computer program comprising: a code to, if a user connects the storage device to the printing apparatus, decrypt encrypted data to be printed and encrypted print setting data indicating a first print setting which can be changed by the user at the printing apparatus and a second print setting which is set by an administrator at an information processing apparatus detachably connectable to the storage device and cannot be changed by the user at the printing apparatus, the encrypted data to be printed and the encrypted print setting data being stored in the storage device connected to the printing apparatus and being data encrypted by the information processing apparatus; a code to change the first print setting indicated by the decrypted print setting data, without changing the second print setting indicated by the decrypted print setting data; and a code to control the printing apparatus to print the decrypted data to be printed in accordance with the first print setting which is changed and the second print setting which is not changed.

* * * * *